(12) United States Patent
Chiu et al.

(10) Patent No.: US 6,512,204 B1
(45) Date of Patent: *Jan. 28, 2003

(54) ION SENSOR GLOW PLUG ASSEMBLY

(75) Inventors: Randolph Kwok-Kin Chiu, Davison; Keith Michael Brenske, Flushing; Haskell Simpkins, Grand Blanc, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/699,016

(22) Filed: Oct. 27, 2000

Related U.S. Application Data
(60) Provisional application No. 60/189,173, filed on Mar. 14, 2000.

(51) Int. Cl.[7] .................................................. F23Q 7/00
(52) U.S. Cl. ..................................... 219/270; 123/145 A
(58) Field of Search ................................ 219/270, 544; 123/145 A, 145 R; 361/264–266

(56) References Cited

U.S. PATENT DOCUMENTS

| | | | | |
|---|---|---|---|---|
| 4,786,781 A | * | 11/1988 | Nozaki et al. | 219/270 |
| 5,626,781 A | * | 5/1997 | Schmidt et al. | 219/270 |
| 5,645,742 A | * | 7/1997 | Schmidt et al. | 219/270 |
| 5,893,993 A | * | 4/1999 | Kurano | 219/270 |
| 5,922,229 A | * | 7/1999 | Kurano | 219/270 |
| 6,215,105 B1 | * | 4/2001 | Simpkins et al. | 219/270 |
| 6,248,980 B1 | * | 6/2001 | Chiu et al. | 219/270 |
| 6,285,007 B1 | * | 9/2001 | Chiu et al. | 219/270 |

FOREIGN PATENT DOCUMENTS

EP 834652 * 4/1998

* cited by examiner

*Primary Examiner*—John A. Jeffery
(74) *Attorney, Agent, or Firm*—Vincent A. Cichosz

(57) ABSTRACT

An ion sensor glow plug assembly includes a metal shell for attachment to a cylinder head of a compression ignition engine. The ion sensor glow plug assembly also includes a center terminal at least partially disposed in the metal shell and connected to a source of power to create a heating circuit. The ion sensor glow plug assembly includes a metal glow sheath disposed at least partially in the metal shell and about the center terminal. The ion sensor glow plug assembly further includes an insulator disposed about the metal glow sheath and at least partially in the metal shell and extending axially into a glow area of the metal glow sheath to clean off soot on the insulator by glowing.

31 Claims, 2 Drawing Sheets

ION SENSOR GLOW PLUG ASSEMBLY

CROSS-REFERENCE TO RELATED APPLICATION(S)

The present invention claims the priority date of copending U.S. Provisional Patent Application Serial No. 60/189,173, filed Mar. 14, 2000.

TECHNICAL FIELD

The present invention relates generally to glow plugs for engines and, more particularly, to an ion sensor glow plug assembly for an engine of a vehicle.

BACKGROUND OF THE INVENTION

It is known to provide an ion sensor for an engine of a vehicle. The ion sensor is used as a closed loop feedback to detect fuel injection timing and intensity of combustion in each cylinder of the engine so as to control and improve engine performance.

It is also known to provide a glow plug for a compression ignition engine such as a diesel engine. The glow plug typically has a metal glow tip that extends into a chamber of the engine. The purpose of the glow plug is to aid in cold starting of the diesel engine.

Although the above ion sensors and glow plugs have worked, it is desirable to combine the two to provide an ion sensor glow plug assembly. It is also desirable to provide an ion sensor glow plug assembly that is self-cleaning for soot in a compression ignition engine such as a diesel engine of a vehicle.

SUMMARY OF THE INVENTION

It is, therefore, one object of the present invention to provide an ion sensor glow plug assembly for an engine of a vehicle.

It is another object of the present invention to provide an ion sensor glow plug assembly that is self-cleaning for soot in a compression ignition engine of a vehicle.

To achieve the foregoing objects, the present invention is an ion sensor glow plug assembly including a metal shell for attachment to a cylinder head of a compression ignition engine. The ion sensor glow plug assembly also includes a center terminal at least partially disposed in the metal shell and connected to a source of power to create a heating circuit. The ion sensor glow plug assembly includes a metal glow sheath disposed at least partially in the metal shell and about the center terminal. The ion sensor glow plug assembly further includes an insulator disposed about the metal glow sheath and at least partially in the metal shell and extending axially into a glow area of the metal glow sheath to clean off soot on the insulator by glowing.

One advantage of the present invention is that an ion sensor glow plug assembly is provided for an engine of a vehicle. Another advantage of the present invention is that the ion sensor glow plug assembly is self-cleaning for soot in a compression ignition engine such as a diesel engine. Yet another advantage of the present invention is that the ion sensor glow plug assembly incorporates a metal glow sheath with a ceramic barrier coating deposited onto it to isolate it from the steel shell for ion sensing purposes. A further advantage of the present invention is that the ion sensor glow plug assembly allows closed loop control of a compression ignition engine such as a diesel engine.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
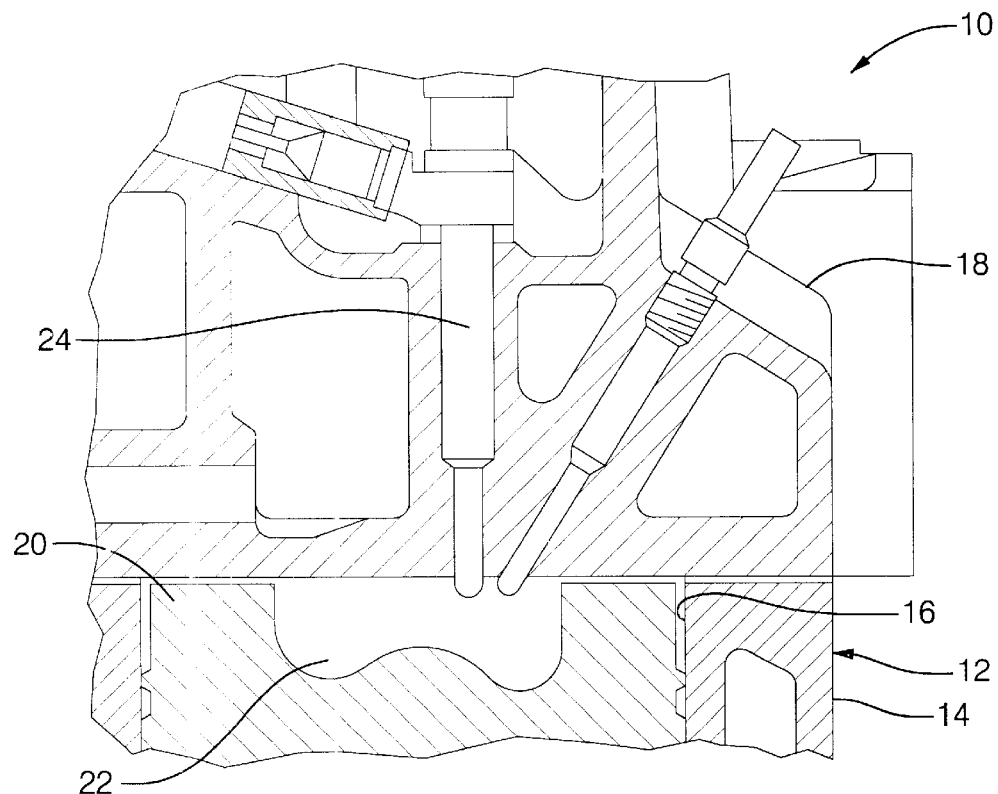
FIG. 1 is a fragmentary elevational view of an ion sensor glow plug assembly, according to the present invention, illustrated in operational relationship with an engine of a vehicle.
Figure 2:
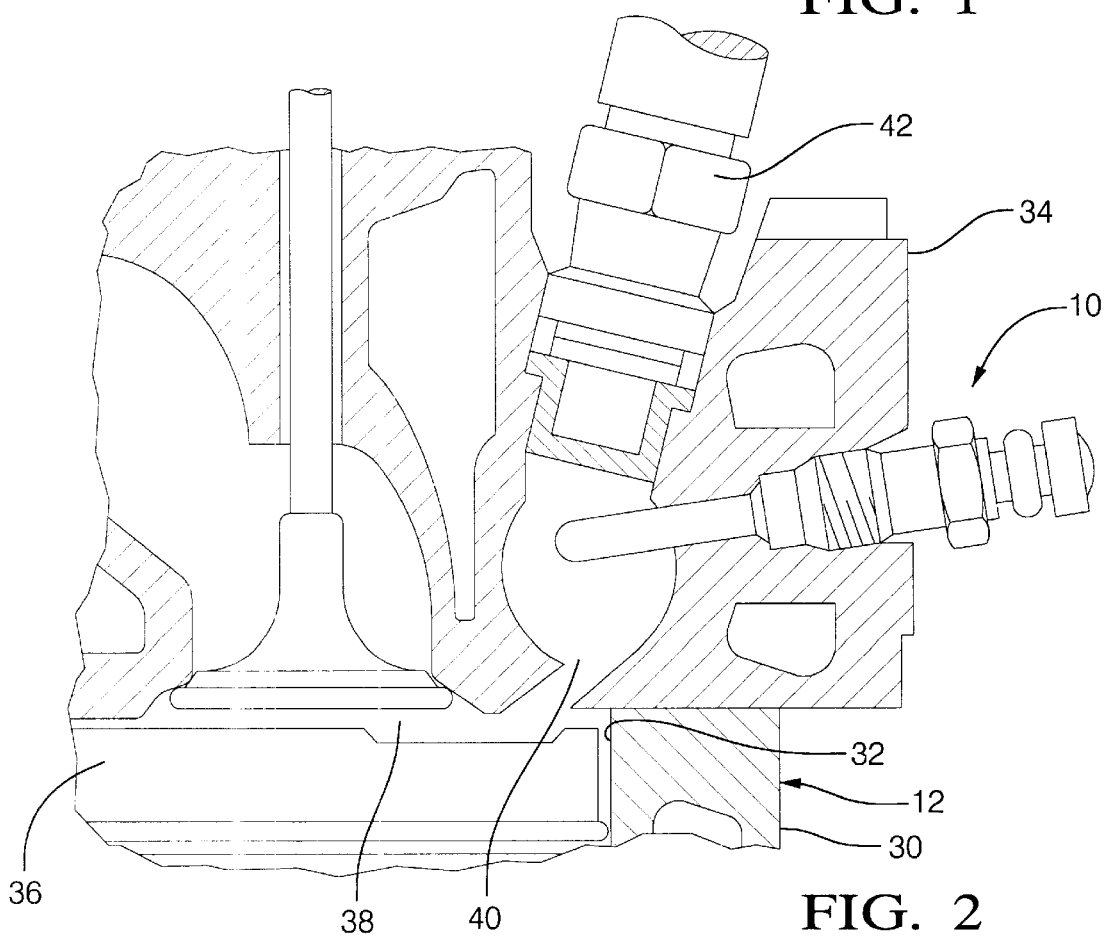
FIG. 2 is a view similar to FIG. 1 of the ion sensor glow plug assembly illustrated in operational relationship with another engine.

Referring to the drawings and in particular FIGS. 1 and 2, one embodiment of an ion sensor glow plug assembly 10, according to the present invention, is shown for a compression ignition engine, generally indicated at 12, such as a diesel engine in a vehicle (not shown). As illustrated in FIG. 1, the compression ignition engine 12 may be an open chamber type diesel engine including a cylinder block 14 defining a cylinder 16 closed by a cylinder head 18. The compression ignition engine 12 also includes a piston 20 reciprocal in the cylinder 16 and defines a recessed bowl, which together with the cylinder head 18 forms a combustion chamber 22. The compression ignition engine 12 includes an injection nozzle or injector 24 mounted in the cylinder head 18, which sprays fuel into the combustion chamber 22 for compression ignition therein. The compression ignition engine 12 further includes the ion sensor glow plug assembly 10 mounted in the cylinder head 18 and extending into the combustion chamber 22 for a function to be described. It should be appreciated that, except for the ion sensor glow plug assembly 10, the compression ignition engine 12 is conventional and known in the art.

As illustrated in FIG. 2, the compression ignition engine 12 may be pre-chamber type diesel engine including a cylinder block 30 defining a cylinder 32 closed by a cylinder head 34. The compression ignition engine 12 also includes a piston 36 reciprocal in the cylinder 32. The piston 36 and cylinder head 34 form a combustion chamber 38, which connects with a pre-combustion chamber or pre-chamber 40 within the cylinder head 34. The compression ignition engine 12 includes an injection nozzle or injector 42 mounted in the cylinder head 34 for injecting fuel into the pre-chamber 40. The compression ignition engine 12 includes the ion sensor glow plug assembly 10 mounted in the cylinder head 34 and extending into the pre-chamber 40 for a function to be described. It should be appreciated that, except for the ion sensor glow plug assembly 10, the compression ignition engine 12 is conventional and known in the art.

Figure 3:
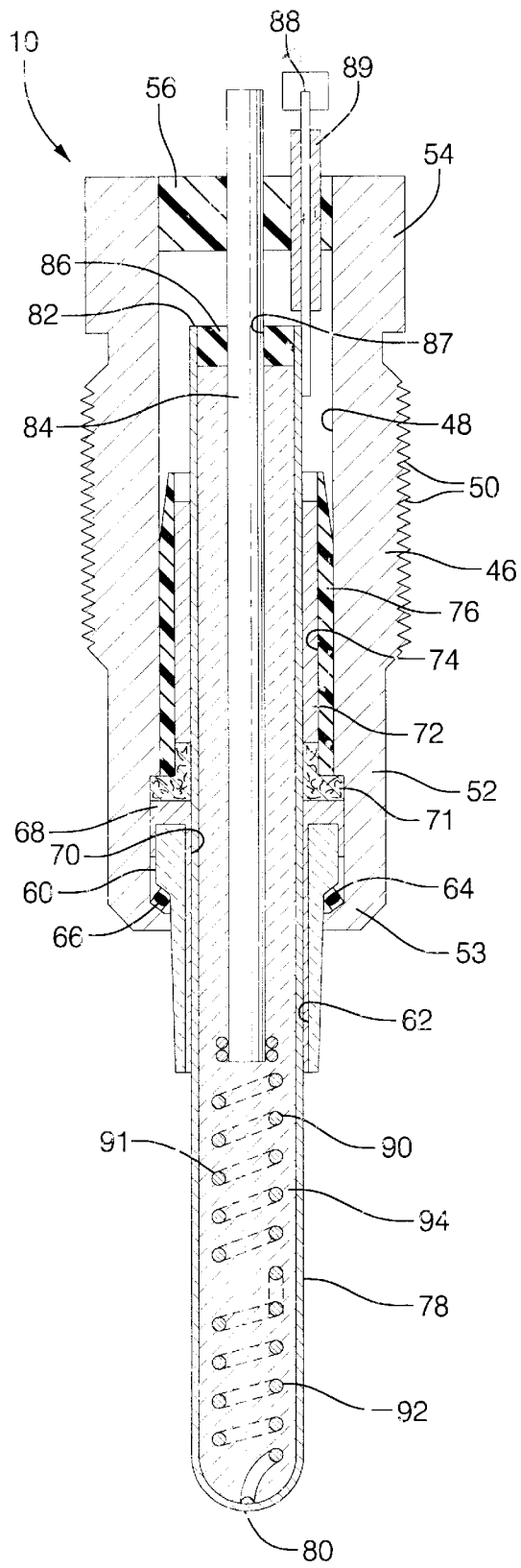
FIG. 3 is a fragmentary elevational view of the ion sensor glow plug assembly of FIGS. 1 and 2.

Referring to FIG. 3, the ion sensor glow plug assembly 10 includes a housing or shell 46 extending axially for engaging the cylinder head 18,34. The shell 46 is generally cylindrical in shape and has a passageway 48 extending axially therethrough. The shell 46 has a plurality of exterior threads 50 for threaded engagement with the cylinder head 18,34. The exterior threads 50 are of a ten millimeter (10 mm) type. The shell 46 has a reduced diameter end 52 adjacent one end of the exterior threads 50 forming a shell seat 53 and a hexagonal shaped end 54 adjacent the other end of the exterior threads 50 for a function to be described. The hexagonal shaped end 54 is of a ten millimeter (10 mm) type. The shell 46 is made of a metal material such as steel. It should be appreciated that the shell seat 53 is machined to conform to an engine seat (not shown).

The ion sensor glow plug assembly 10 may include a seal 56 disposed or inserted in an open end of the passageway 48 at the hexagonal shaped end 54 of the shell 46 and an electrical connector (not shown) disposed adjacent the seal 56 for a function to be described. The seal 56 is made of either a plastic or elastomeric material. It should be appreciated that the electrical connector mates with terminals of the ion sensor glow plug assembly 10.

The ion sensor glow plug assembly 10 also includes an insulator 60 partially disposed in the shell 46 and extending into the passageway 48. The insulator 60 is generally cylindrical in shape and extends axially. The insulator 60 has a passageway 62 extending axially therethrough. The insulator 60 has an insulator seat 64 extending radially outwardly and axially. The insulator 60 is made of a ceramic material such as alumina. The insulator 60 is extended into a glow area of a glow sheath 78 to be described to glow the glow sheath 78 and clean off any soot (carbon) that may induce a short circuit between the shell 46 and glow sheath 78. It should be appreciated that the shell seat 53 is crimped to retain the insulator 60 to the shell 46.

The ion sensor glow plug assembly 10 includes a gasket or seal 66 disposed between the insulator 60 and the shell 46 to provide vibration damping and mechanical support. The gasket 66 is made of a relatively soft metal material such as copper or steel. The gasket 66 is disposed in the passageway 48 between the shell seat 53 and the insulator seat 64.

The ion sensor glow plug assembly 10 includes a coating 68 disposed about one end of the insulator 60. The coating 68 is generally cylindrical in shape and extends axially over the other end of the insulator 60. The coating 68 has an aperture 70 extending axially therethrough. The coating 68 is made of an insulating material such as polyamide, preferably PI 2545. The polyamide is a fluid cured to a solid coating having an operating temperature greater than four hundred degrees centigrade (400° C.). The ion sensor glow plug assembly 10 includes a matting 71 disposed in the passageway 48 adjacent the coating 68. The matting 71 is generally annular and made of an insulating material such as intumescent fiber having an operating temperature greater than six hundred degrees centigrade (600° C.). It should be appreciated that the coating 68 and matting 71 prevent soot and/or humidity from shorting a surface of a seal 72 to be described.

The ion sensor glow plug assembly 10 includes a seal 72 disposed adjacent one end of the matting 71. The seal 72 is generally cylindrical in shape and has an aperture 74 extending axially therethrough. The seal 72 is made of an insulating material such as glass and is pre-formed. The ion sensor glow plug assembly 10 includes a seal ring 76 disposed about the seal 72 and overlapping one end of the matting 71. The seal ring 76 is generally annular and made of an insulating material such as glass, preferably Inconel 600 or Inconel 601. It should be appreciated that the seal 72 isolates the shell 46 from a glow sheath 78 to be described to create an ion sensing circuit. It should also be appreciated that the matting 71 is inserted at the lower end of the seal 72 and seal ring 76 and between the glow sheath 78 and the passageway 48 of the shell 46.

The ion sensor glow plug assembly 10 includes a glow sheath 78 partially disposed in the passageway 48 of the shell 46. The glow sheath 78 is generally cylindrical and tubular in shape. The glow sheath 78 has a closed end 80 spaced axially from the end of the insulator 60. The glow sheath 78 extends axially from the closed end 80 through the apertures 62 and 74 of the insulator 60 and seal 72, respectively, to an open end 82. The glow sheath 78 is made of a metal material such as a nickel base alloy Inconel 601 or 600. The glow sheath 78 is secured by the seal 72 and seal ring 76 by curing the glass seal 72 in a 1000° C. furnace and subsequently press-fitted and secured into the shell 46.

The ion sensor glow plug assembly 10 includes a center or centerwire terminal 84 disposed partially within the glow sheath 78. The center terminal 84 is generally cylindrical in shape and extends axially. The center terminal 84 has one end spaced axially from the closed end 80 of the glow sheath 78 and extends axially to another end that matingly engages the electrical connector. The center terminal 84 is made of a metal material such as nickel (Ni), nickel-chromium (Ni—Cr), or nickel-chromium-iron (Ni—Cr—Fe). It should be appreciated that the center terminal 84 is a first heater terminal for heater portion 92 of an electrical coil 90 to be described.

The ion sensor glow plug assembly 10 includes a seal 86 inserted into and disposed in the open end 82 of the glow sheath 78. The seal 86 has an aperture 87 extending axially therethrough and the center terminal 84 extends axially through aperture 87 in the seal 86. The seal 86 is made of either a plastic or elastomeric material. It should be appreciated that the seal 86 seals the open end 82 of the glow sheath 78.

The ion sensor glow plug assembly 10 includes a second terminal 88 having insulation 89 over a portion thereof and extending through the seal 56. The second terminal 88 is attached to an outside diameter of an upper end of the glow sheath 78 by suitable means such as welding. The second terminal 88 matingly engages the electrical connector. It should be appreciated that the second terminal 88 is used for both a second heater terminal for the heater portion 92 of the electrical coil 90 to be described and an ion sensor terminal for the glow sheath 78.

The ion sensor glow plug assembly 10 includes an electrical coil 90 disposed about a portion of the center terminal 84. The electrical coil 90 has a first or current regulating portion 91 having one end disposed about the center terminal 84 and extending axially. The current regulating portion 91 is connected to the center terminal 84 suitable means such as welding. The current regulating portion 91 is made of a metal material such as nickel-iron (Ni—Fe) or cobalt-iron (Co—Fe). The electrical coil 90 has a second or heating portion 92 having one end joined or connected to the current regulating portion 91 by suitable means such as spot welding and another end connected to the closed end 80 of the glow sheath 78 by suitable means such as spot welding. The heating portion 92 is made of a metal material such as nickel-chromium (Ni—Cr) or iron-chromium-aluminum (Fe—Cr—Al). It should be appreciated that the second terminal 88 and center terminal 84 act as terminals for the electrical coil 90 to create a heating circuit and are connected to the electrical connector, which, in turn, is connected to an electronic controller (not shown). It should be appreciated that the controller is conventional and known in the art.

The ion sensor glow plug assembly 10 further includes a filling material compound 94 disposed inside the glow sheath 78. The filling material 94 is made of a ceramic powder material such as magnesia or alumina. The filling material 94 is disposed inside the glow sheath 78 and around the electrical coil 90 and center terminal 84. The filling material 94 provides mechanical support of the center terminal 84 and electrical coil 90 in an x-y direction. The filling material 94 also acts as a heat conductor from the electrical coil 90 to the glow sheath 78 during glowing. It should be appreciated that the filling material 94 provides both electrical insulation and thermal conduction between the center terminal 84, electrical coil 90, and glow sheath 78.

To assemble the ion sensor glow plug assembly 10, the heating portion 92 of the electrical coil 90 is joined such as by welding to the current regulating portion 91 of the electrical coil 90. The current regulating portion 91 is then joined such as by welding to the center terminal 84, which is the first heater terminal. The heating portion 92 of the electrical coil 90 is joined such as by welding to the closed end 80 of the glow sheath 78. Ceramic powder, made of magnesia or alumina, is then inserted to the inside of the glow sheath 78 and compacted around the terminals/ electrical coil 90 by vibration. The seal 86 is then inserted into the open end 82 of the glow sheath 78. The glow sheath 78 is then swaged to a smaller diameter or size to further compact the filling material 94 to provide for both electrical insulation and thermal conduction between the center terminal 84, electrical coil 90, and glow sheath 78.

The seal 72 is then placed around the glow sheath 78 and the seal ring 76 is placed around the seal 72. The glow sheath 78, glass seal perform 72 and glass seal ring 76 are assembled and sent through a conveyor belt furnace (not shown) having a heating and cooling temperature profile up to a maximum temperature of one thousand degrees centigrade (1000° C.). The glass sealed glow sheath assembly 78,72,76 then has its open end 82 cleaned, terminal 88 attached by spot welding and seal 86 re-inserted before being press-fitted into the shell 46 through its lower end. The matting 71, having a decomposition temperature of six hundred degrees centigrade (600° C.), is then inserted into the passageway 48 between the lower end of the seal 72 and the inner diameter of the shell 46. The coating 68 may also be added. The insulator 60 and gasket 66 are then inserted into the passageway 48 and the shell 46 is crimped over the gasket 66 to form the shell seat 53. The shell seat 53 is then machined. The ion sensor glow plug assembly 10 is then heated at one hundred twenty degrees centigrade (120° C.) for approximately thirty (30) minutes to cure the coating 68. The seal 56 is then inserted into the upper or open end of the passageway 48 of the shell 46 and the connector is connected to the heater terminals of the center terminal 84 and second terminal 88. The ion sensor glow plug assembly 10 is then completely assembled.

In operation of the ion sensor glow plug assembly 10, the center terminal 84 carries the supply voltage from the electrical connector for the heating circuit. Current flows from the electrical connector to the center terminal 84, which passes through the current regulating portion 91 and heating portion 92 of the electrical coil 90, glow sheath 78, and second terminal 88 back to the electrical connector to form a glow plug electrical/heating circuit. The second terminal 88 and glow sheath 78 carry the supply voltage from the electrical connector for the ion sensor circuit. An electrical switch (not shown) is used upstream to connect or switch the second terminal from heating or glowing to ion sensing when glowing is not needed. When there is combustion in the cylinder 16,32, the burnt gases are ionized and conduct or carry current from the electrical connector through the second terminal 88 to the glow sheath 78 and through the ionized gases to an engine ground, which is the piston 20,36 or the shell 46. The exposed portion of the insulator 60 is disposed in the high temperature area of the glow sheath 78 which will burn off by glowing any soot and moisture formation on the insulator 60 that may create a short between the glow sheath 78 and the shell seat 53 to provide the soot self-cleaning feature of the ion sensor glow plug assembly 10. It should be appreciated that the matting 71 and/or coating 68 and 70 prevent soot such as carbon from seeping through the clearance 62 between the insulator 60 and the glow sheath 78, resulting in bridging or shorting of the seal 72.

It should be appreciated that the seal 72 creates an electrical barrier between the glow sheath 78 and the shell 46 so that both glowing and ion sensing can be created since these two functions do not operate simultaneously. It should also be appreciated that the seal 72 is made of a mixture of glass and ceramic and can stand an operating temperature of 600° C. because it melts at about 1000° C. and has high volume resistivity at high temperature so it keeps its electrical insulation integrity at high temperature such as above 600° C. It should further be appreciated that the matting 71 can prevent any moisture or soot (carbon) from reducing the possibility of electrical shorting between the glow sheath 78 and the shell 46. It should still further be appreciated that the insulator 60 is extended into the high temperature glow area of a glow sheath 78 to burn off, by glowing, any soot (carbon) and moisture formation on the insulator 60 that may create reduced resistance between the shell 46 and glow sheath 78.

Figure 4:
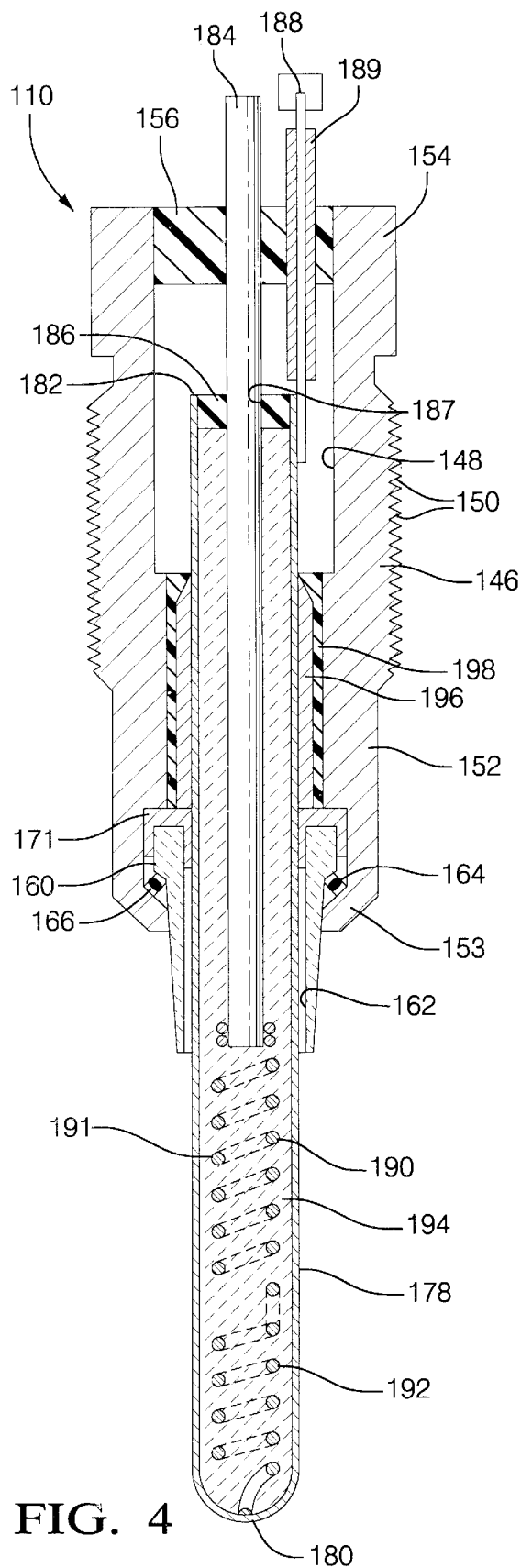
FIG. 4 is a fragmentary elevational view of another embodiment, according to the present invention, of the ion sensor glow plug assembly of FIGS. 1 and 2.

Referring to FIG. 4, another embodiment, according to the present invention, of the ion sensor glow plug assembly 10 is shown. Like parts of the ion sensor glow plug assembly 10 have like reference numerals increased by one hundred (100). In this embodiment, the ion sensor glow plug assembly 110 eliminates the polyamide coating, glass seal, and glass seal ring. The ion sensor glow plug assembly 110 includes a first coating 196 on a portion of the glow sheath 178 that is partially disposed in the shell 146 and extending into the passageway 148. The first coating 196 is disposed annularly about the glow sheath 178 and extends radially and axially. The first coating 196 has one end spaced from the open end 182 of the glow sheath 178 and extends axially to the matting 171. The first coating 196 has a radial thickness of 0.001 inches to 0.010 inches, preferably 0.004 inches to 0.006 inches. The first coating 196 is made of an insulating material such as alumina ($Al_2O_3$) or other suitable ceramic material. The first coating 196 is impregnated into the outside diameter of the glow sheath 178 using a thermal particle depositing process such as High Velocity Oxy-Fuel (HVOF), D-Gun, or Plasma Jet Spraying, which process is conventional and known in the art. It should be appreciated that the first coating 196 isolates the glow sheath 178 from the shell 146, thus creating an ion sensing circuit, and retains a resistance sufficient for ion sensing during glowing and/or engine operation.

The ion sensor glow plug assembly 110 includes a second or conformal coating 198 disposed over the first coating 196. The second coating 198 is a relatively thin layer to mechanically retain the glow sheath 178 in the shell 146. The second coating 198 is made of a high temperature material such as polyamides, silicones, locktite, epoxy or the like having high resistivity at high temperature such as four hundred degrees centigrade (400° C.). It should be appreciated that the second coating 198 can be cured before or after final assembly. It should also be appreciated that the second coating 198 prevents moisture formation between the glow sheath 178 and shell 146 and seals off combustion gases from passing between the first coating 196 and the passageway 148 of the shell 146.

After the glow sheath 178 is swaged to a smaller diameter or size to compact the filling material 194, the outer diameter of the glow sheath 178 is then impregnated with the first coating 196 using thermal particle depositing with conventional processes such as Plasma Jet Spraying, High Velocity Oxy-Fuel (HVOF), or D-Gun®. The second terminal 188, which is used for both the ion sensor terminal and the second heater terminal, is attached by suitable means such as welding to the outside diameter of the upper end 182 of the glow sheath 178. Next, a thin second coating 198 is applied over the first coating 196 in the press-fit area. The glow sheath 178 is then mechanically retained such as by being press-fitted into the passageway 148 of the shell 146 through its lower end. The matting 171 is then inserted at the lower end of the coatings 196 and 198 and between the glow sheath 178 and the passageway 148 of the shell 146. The insulator 160 and gasket 166 are also inserted into the lower end of the shell 146 as illustrated in FIG. 4. The shell 146 is then crimped over the gasket 166 to retain the insulator 160, gasket 166, and matting 171. The shell 146 is then machined to conform to the engine seat (not shown). The seal 156 is then inserted into the upper or open end of the passageway 148 of the shell 146. The ion sensor glow plug assembly 110 may be heated before or after final assembly to cure the second coating 198. The ion sensor glow plug assembly 110 is then completely assembled. The operation of the ion sensor glow plug assembly 110 is similar to the ion sensor glow plug assembly 10.

It should be appreciated that first coating 196 and second coating 198 create an electrical barrier between the glow sheath 178 and the shell 146 so that both glowing and ion sensing can be created since these two functions do not operate simultaneously. It should also be appreciated that the second coating 198 is used as a lubricant and a sealant to aid in reducing the press-fit force during assembly and to seal off any possible combustion gas leakage between the glow sheath 178, first coating 196, and the passageway 148 of the shell 146. It should further be appreciated that the matting 171 and second coating 198, if polyamide is used, can prevent any moisture or soot (carbon) from reducing the possibility of electrical shorting between the glow sheath 178 and the shell 146. It should still further be appreciated that the insulator 160 is extended into the high temperature glow area of a glow sheath 178 to burn off, by glowing, any soot (carbon) and moisture formation on the insulator 160 that may create reduced resistance between the shell 146 and glow sheath 178.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An ion sensor glow plug assembly comprising:
   a metal shell for attachment to a cylinder head of a compression ignition engine;
   a center terminal at least partially disposed in said metal shell and connected to a source of power to create a heating circuit; and
   a metal glow sheath disposed at least partially in said metal shell and about said center terminal; and
   an insulator disposed about said metal glow sheath and at least partially in said metal shell and extending axially into a glow area of said metal glow sheath to clean off soot on said insulator by glowing.

2. An ion sensor glow plug assembly as set forth in claim 1 wherein said center terminal is made of a metal material.

3. An ion sensor glow plug assembly as set forth in claim 1 wherein said metal glow sheath has a closed end spaced from an end of said center terminal.

4. An ion sensor glow plug assembly as set forth in claim 1 including an electrical coil disposed about a portion of said center terminal.

5. An ion sensor glow plug assembly as set forth in claim 4 wherein said electrical coil has a current regulating portion connected to said center terminal and a heating portion connected to said current regulating portion and to said glow sheath.

6. An ion sensor glow plug assembly as set forth in claim 4 including a seal disposed in an open end of said glow sheath, said center terminal extending through said seal.

7. An ion sensor glow plug assembly as set forth in claim 1 including an insulative seal disposed at least partially around said metal glow sheath to isolate said metal shell from said metal glow sheath to create an ion sensing circuit.

8. An ion sensor glow plug assembly as set forth in claim 7 including a matting disposed within said metal shell adjacent said insulative seal to prevent soot or moisture from shorting said insulative seal.

9. An ion sensor glow plug assembly as set forth in claim 7 including a coating disposed within said metal shell adjacent said insulative seal or said matting to prevent soot or moisture from shorting said insulative seal.

10. An ion sensor glow plug assembly as set forth in claim 7 wherein said insulative seal is made of a glass ceramic material.

11. An ion sensor glow plug assembly as set forth in claim 1 including a filling material disposed between said metal glow sheath and said center terminal.

12. An ion sensor glow plug assembly as set forth in claim 1 including a coating disposed about a portion of said glow sheath between said glow sheath and said shell to isolate said shell from said glow sheath.

13. An ion sensor glow plug assembly as set forth in claim 12 wherein said coating comprises an insulative material having a predetermined thickness disposed on an outer periphery of said glow sheath.

14. A self-cleaning ion sensor glow plug assembly for a compression ignition engine comprising:
    a metal shell for attachment to a cylinder head of the compressive ignition engine;
    a center terminal at least partially disposed in said metal shell and connected to a source of power to create a heating circuit;
    a metal glow sheath disposed at least partially about said center terminal and extending into said metal shell;
    an insulative seal disposed at least partially around said metal glow sheath and in said metal shell to isolate said metal shell from said metal glow sheath to create an ion sensing circuit; and
    an insulator disposed about said glow sheath and at least partially in said metal shell and extending axially into a glow area of said metal glow sheath to clean off soot on said insulator by glowing.

15. A self-cleaning ion sensor glow plug assembly as set forth in claim 14 wherein said glow sheath has a closed end spaced from an end of said center terminal.

16. A self-cleaning ion sensor glow plug assembly as set forth in claim 14 including an electrical coil disposed about a portion of said center terminal.

17. A self-cleaning ion sensor glow plug assembly as set forth in claim 16 wherein said electrical coil has a current regulating portion connected to said center terminal and a heating portion connected to said current regulating portion and said glow sheath.

18. A self-cleaning ion sensor glow plug assembly as set forth in claim 17 including a seal disposed in an open end of said glow sheath, said center terminal extending through said seal.

19. A self-cleaning ion sensor glow plug assembly as set forth in claim 14 including a matting disposed within said metal shell adjacent said insulator to prevent soot or moisture from shorting said insulative seal.

20. A self-cleaning ion sensor glow plug assembly as set forth in claim 14 including a coating disposed within said metal shell adjacent said insulative seal or said matting to prevent soot or moisture from shorting said insulative seal.

21. A self-cleaning ion sensor glow plug assembly as set forth in claim 14 including a filling material disposed between said metal glow sheath and said center terminal.

22. An ion sensor glow plug assembly comprising:
a shell for attachment to a cylinder head of a compression ignition engine and having a passageway extending axially therethrough;
a center terminal disposed at least partially in said passageway of said shell and connected to a source of power to create a heating circuit;
a glow sheath disposed at least partially in said passageway of said shell and about said center terminal to create an ion sensing circuit;
an insulator disposed at least partially in said passageway of said shell and about a portion of said glow sheath and extending axially into a glow area of said glow sheath to clean off soot on said insulator by glowing; and
a coating disposed about a portion of said glow sheath between said glow sheath and said shell to isolate said shell from said glow sheath.

23. An ion sensor glow plug assembly as set forth in claim 22 wherein said coating comprises an insulative material having a predetermined thickness disposed on an outer periphery of said glow sheath.

24. An ion sensor glow plug assembly as set forth in claim 22 wherein said glow sheath has a closed end spaced from an end of said center terminal.

25. An ion sensor glow plug assembly as set forth in claim 22 including an electrical coil disposed about a portion of said center terminal.

26. An ion sensor glow plug assembly as set forth in claim 25 wherein said electrical coil has a current regulating portion connected to said center terminal and a heating portion connected to said current regulating portion and said glow sheath.

27. An ion sensor glow plug assembly as set forth in claim 25 including a seal disposed in an open end of said glow sheath, said center terminal extending through said seal.

28. An ion sensor glow plug assembly as set forth in claim 22 including a terminal connected to said glow sheath and a source of power.

29. An ion sensor glow plug assembly as set forth in claim 22 including a matting disposed within said passageway of said shell adjacent said insulator to prevent soot or moisture from shorting said glow sheath.

30. An ion sensor glow plug assembly as set forth in claim 22 including a second coating disposed over said coating to retain said glow sheath in said passageway of said shell.

31. An ion sensor glow plug assembly as set forth in claim 22 including a filling material disposed between said glow sheath and said center terminal.

* * * * *